March 10, 1942.  J. KEISER  2,275,633
DUAL WHEEL WRENCH
Filed March 22, 1941
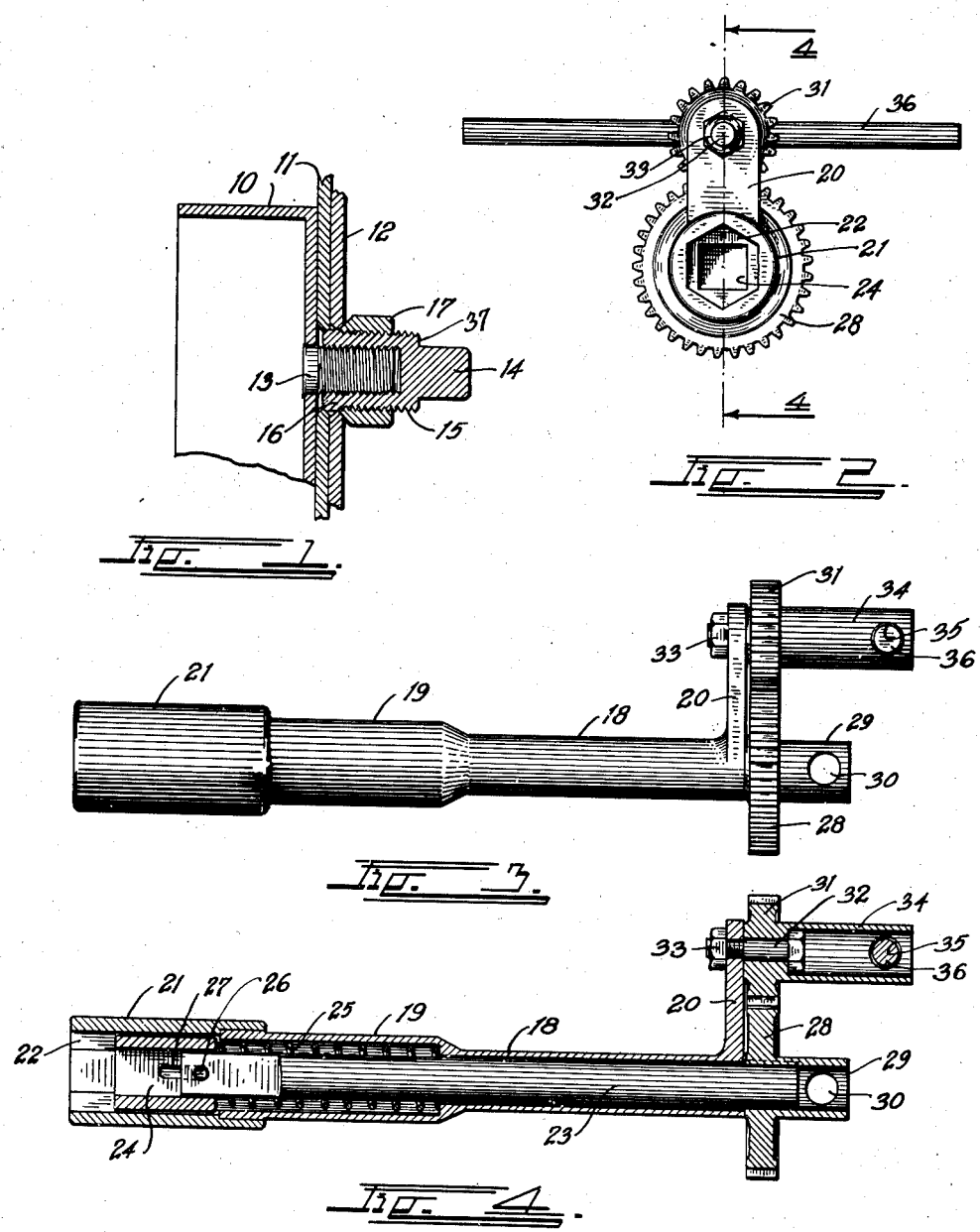
INVENTOR.
JOHN KEISER.
BY
ATTORNEY.

Patented Mar. 10, 1942

2,275,633

UNITED STATES PATENT OFFICE 2,275,633

DUAL WHEEL WRENCH

John Keiser, Windsor, Colo.

Application March 22, 1941, Serial No. 384,638

1 Claim. (Cl. 81—56)

One of the standard constructions for dual wheels on automotive vehicles, such as trucks, is known as the "Budd" type. In this type of wheel both wheels are stamped from sheet metal and have flattened hub portions which fit tightly against each other and against the brake drum of the vehicle. The hub portion of the inner wheel is clamped in place by an inner nut having both internal and external threads. The outer wheel is clamped against the inner wheel by means of an outer nut threaded on the external threads of the protruding inner nut.

In such constructions, it is often extremely difficult to remove the outer nut without removing the inner nut since the inner nut cannot be reached for holding purposes while the outer nut is being rotated.

This invention relates to a wrench for this type of wheel and has for its principal object the provision of a wrench construction which will automatically tighten the inner nut while the outer nut is being unscrewed therefrom so that it will be impossible to unscrew the inner nut when unscrewing the outer nut. This enables the operator to remove the outer dual wheel without removing or disturbing the inner dual wheel regardless of the relative looseness or tightness of the two nuts.

A further object of the invention is to so construct the device that when desired, the inner nut can be removed either with the outer nut or after the outer nut has been removed and to accomplish the above with a single unit operating from a single handle so that the entire operation can be accomplished with a single hand if necessary leaving the other hand free to support the loosened wheel.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is an enlarged fragmentary detail section through a typical wheel lug as employed for holding dual wheels of the "Budd" type in place;

Fig. 2 is a front view of the improved wrench;

Fig. 3 is a side view thereof; and

Fig. 4 is a longitudinal section therethrough, taken on the line 4—4, Fig. 2.

In Fig. 1 of the drawing, a portion of the brake drum of a typical automotive vehicle is indicated at 10, the hub section of an inner dual wheel at 11, and the hub section of an outer dual wheel at 12. A concentric series of fixed threaded wheel lugs 13 project from the outer face of the brake drum 10 through suitable receiving openings in the wheels 11 and 12. The inner wheel 11 is clamped in place by means of an inner nut 14. This nut is of the socket type having internal threads for engaging the lug 13 and also provided with external threads 15 and a square wrench head between which is a shoulder 37. The inner extremity of the nut 14 is enlarged, as shown at 16, so as to engage the periphery of the lug opening in the inner wheel to clamp the latter against the drum 10. An outer hexagonal nut 17 is threaded on the threads 15 against the peripheral portion of the lug openings in the outer wheel 12 to clamp the latter against the inner wheel 11.

The improved tool is designed for the above described wheel attachment. The tool employs an elongated, hollow shank member 18 having a spring chamber 19 adjacent one extremity and provided with a lever arm 20 adjacent its other extremity. The spring chamber terminates in an outer nut socket member 21 having a hexagonal socket 22 to receive the outer nut 17. The outer socket 21 may be an integral part of the shank 18 or may be made removable therefrom, as illustrated, so as to be interchangeable for different sizes of nuts.

An inner shaft 23 extends throughout the length of the shank 18 terminating at one extremity in an inner nut socket 24 having an orifice for receiving the square head on the inner nut 14. The inner nut socket 24 is slidable on the shaft 23 and is constantly urged outwardly thereon by means of a compression spring 25. The extremity of the shaft 23 entering the socket 24 is squared to prevent rotation of the socket on the shaft. Means are also provided for limiting the outward movement of the socket 24 under the influence of the spring 25. This may be accomplished by means of a pin or screw 26 fixed in the shaft and riding in a slot 27 in the socket 24.

A driven gear 28 is keyed or otherwise secured on the outer extremity of the shaft 23 adjacent the lever 20. This gear is provided with a projecting collar 29 through which a handle opening 30 extends. The gear 28 meshes with a smaller drive gear 31 journalled on a shouldered bolt 32 which is threaded through the lever 20 and locked therein by means of a lock nut 33.

The gear 31 is also provided with a projecting collar 34 having a handle receiving hole 35. The holes 30 and 35 are for the purpose of receiving a rod like handle 36 by means of which the gears may be rotated.

To loosen the outer nut 17, the socket extremity of the tool is forced over both the nuts 14 and 17. The shoulder 37 contacts the inner socket 24 and pushes it onto the shaft 23 as the socket 22 slides over the nut 17. The handle 36 is now inserted in the collar 34 and rotated to the left. The reaction of the gear 31 against the gear 28 tends to rotate the latter to the right so as to exert a tightening action on the nut 14. This reaction causes the gear 31 to act as a traction planet gear and travel around the periphery of the gear 28. The orbital movement of the gear 31 is transmitted through the lever 20 and the shank 18 to the socket 22 to exert an unscrewing action on the nut 17.

It is desired to call attention to the fact that an opposite action is imparted to the nut 14 so that the nut 17 must separate therefrom. It is also desired to point out that due to the difference in diameters between the gear 31 and the gear 28 a multiplied leverage will be obtained which assists greatly in removing exceedingly tight or stuck nuts.

If it is desired to remove the inner nut, the handle 36 is simply inserted in the collar 29 which imparts a direct rotation in any desired direction to the inner nut socket 24.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

A duel socket wrench comprising: a tube; a nut socket on one extremity of said tube; an arm fixed to and projecting diametrically outward at the second extremity of said tube; a rotatable shaft in said tube; a second smaller nut socket on the inner extremity of the shaft within the first nut socket, the outer extremity of said shaft projecting from the second extremity of said tube; a driven gear fixed on the projecting portion of said shaft adjacent the outer face of said arm; a second smaller drive gear rotatably mounted on the outer face of the extremity of said arm in mesh with the driven gear; a hollow sleeve projecting concentrically from said drive gear; and a similar sleeve projecting from said driven gear, both sleeves having openings for the passage of an instrument whereby either gear may be rotated.

JOHN KEISER.